United States Patent
Jiang (10) Patent No.: US 7,822,789 B2
(45) Date of Patent: Oct. 26, 2010

(54) SYSTEM AND METHOD OF PROVIDING PERFORMANCE DATA

(75) Inventor: Baofeng Jiang, Pleasanton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 426 days.

(21) Appl. No.: 11/881,725

(22) Filed: Jul. 27, 2007

(65) Prior Publication Data

US 2009/0030942 A1    Jan. 29, 2009

(51) Int. Cl.
G06F 7/00 (2006.01)
G06F 17/30 (2006.01)

(52) U.S. Cl. ............... 707/812; 725/100; 725/151

(58) Field of Classification Search ......... 707/1–10, 707/100–104.1, 200–206, 600–831; 725/2, 725/100, 105–110, 115, 118, 139, 151–153
See application file for complete search history.

(56) References Cited

U.S. PATENT DOCUMENTS

| | | | |
|---|---|---|---|
| 7,729,381 B2 * | 6/2010 | Savoor et al. | 370/474 |
| 2002/0069284 A1 | 6/2002 | Slemmer et al. | |
| 2005/0183130 A1 | 8/2005 | Sadja et al. | |
| 2007/0033446 A1 | 2/2007 | Tinkler et al. | |
| 2007/0092018 A1 * | 4/2007 | Fonseka et al. | 375/265 |
| 2007/0112575 A1 | 5/2007 | Savoor et al. | |
| 2007/0130322 A1 | 6/2007 | Cambron et al. | |
| 2007/0162932 A1 | 7/2007 | Mickle et al. | |
| 2008/0137549 A1 * | 6/2008 | Manthoulis | 370/252 |
| 2009/0064255 A1 * | 3/2009 | Jiang et al. | 725/118 |

OTHER PUBLICATIONS

Atheros, White Paper IPTV Distribution in Home Networks, Google, 2005, 1-12.*
IPIV—Distribution in Home Networks IPTV—White Paper, 2005, 1-12.*
Anne Bodzinga et al., Interworking IPTV Services with IMS, 2006, IEEE, 1-5.*

* cited by examiner

*Primary Examiner*—Jean B Fleurantin
(74) *Attorney, Agent, or Firm*—Toler Law Group (57) ABSTRACT

A method of providing performance data is disclosed that includes receiving a performance data request at a set-top box device from customer premises equipment. The performance data request identifies a first performance data measurement and the first performance data measurement is related to a performance aspect of the set-top box device. The method also includes identifying a first portion of a data structure that includes the first performance data measurement. The data structure further includes a second portion designated for a second performance data measurement. The data structure is stored at a data storage device associated with the set-top box device. Further, the method includes retrieving the first performance data measurement from the data storage device based on the first portion of the data structure and sending data associated with the first performance data measurement from the set-top box device to the customer premises equipment.

16 Claims, 8 Drawing Sheets

SYSTEM AND METHOD OF PROVIDING PERFORMANCE DATA

FIELD OF THE DISCLOSURE

The present disclosure is generally related to systems and methods of providing performance data.

BACKGROUND

The performance of devices included in a video content provider network can affect the quality of service delivered to subscribers. Accordingly, video content providers may collect data from network devices to monitor the performance of the network devices. However, data indicating the performance of certain network devices, such as set-top box devices, can be difficult to collect where the video content provider does not have direct access to the network device via the network. Hence, there is a need for an improved system and method of monitoring and providing performance data.

DETAILED DESCRIPTION OF THE DRAWINGS

A system to provide performance data is disclosed that includes processing logic and memory accessible to the processing logic. The memory includes first instructions executable by the processing logic according to a first format to perform at least one function related to operation of an end user interactive television device. The memory also includes second instructions executable by the processing logic according to a second format to access performance data measurements associated with the end user interactive television device. The performance data measurements may be retrieved externally upon request.

In another embodiment, a method of providing performance data is disclosed that includes receiving a performance data request at a set-top box device from customer premises equipment. The performance data request identifies a first performance data measurement and the first performance data measurement relates to a performance aspect of the set-top box device. The method also includes identifying a first portion of a data structure that includes the first performance data measurement, where the data structure further includes a second portion designated for a second performance data measurement. The data structure is stored at a data storage device associated with the set-top box device. In addition, the method includes retrieving the first performance data measurement from the data storage device based on the first portion of the data structure and sending data associated with the first performance data measurement from the set-top box device to the customer premises equipment.

In another embodiment, a method of providing performance data is disclosed that includes sending a performance data request to a set-top box device according to a first format that is independent of a second format associated with operating software of the set-top box device. The performance data request identifies a predetermined performance data measurement and the predetermined performance data measurement relates to a measurable performance aspect associated with operation of the set-top box device. The method also includes receiving data associated with the predetermined performance data measurement from the set-top box device.

In another embodiment, a method of providing performance data from multiple set-top box devices is disclosed that includes sending a first performance data request to a first set-top box device via a first dedicated measurement data access interface that is independent of operating software of the first set-top box device. The first performance data request identifies a first predetermined performance data measurement and the first predetermined performance data measurement relates to a first measurable performance aspect associated with operation of the first set-top box device. The method also includes receiving first performance data associated with the first predetermined performance data measurement from the first set-top box device. In addition, the method includes sending a second performance data request to a second set-top box device via a second dedicated measurement data access interface that is independent of operating software of the second set-top box device. The second performance data request identifies a second predetermined performance data measurement and the second predetermined performance data measurement relates to a second measurable performance aspect associated with operation of the second set-top box device. Further, the method includes receiving second performance data associated with the second predetermined performance data measurement.

In another embodiment, a computer-readable medium is disclosed having instructions to cause a processor to execute a method that includes sending a first performance data request to a first set-top box device using a dedicated measurement data access interface that is independent of operating software of the first set-top box device. The first performance data request identifies a first predetermined performance data measurement and the first predetermined performance data measurement relates to a first measurable performance aspect associated with operation of the first set-top box device. The computer-readable medium also has instructions to cause the processor to execute a method that includes receiving first performance data associated with the first predetermined performance data measurement from the first set-top box device.

In addition, the computer-readable medium has instructions to cause the processor to execute a method that includes sending a second performance data request to a second set-top box device using a dedicated measurement data access interface that is independent of operating software of the second set-top box device. The second performance data request identifies a second predetermined performance data measurement and the second predetermined performance data measurement relates to a second measurable performance aspect associated with operation of the second set-top box device. Further, the computer-readable medium has instructions to cause the processor to execute a method that includes receiving second performance data associated with the second predetermined performance data measurement, storing the first performance data at a network data storage device, and storing the second performance data at the network data storage device.

Figure 1:
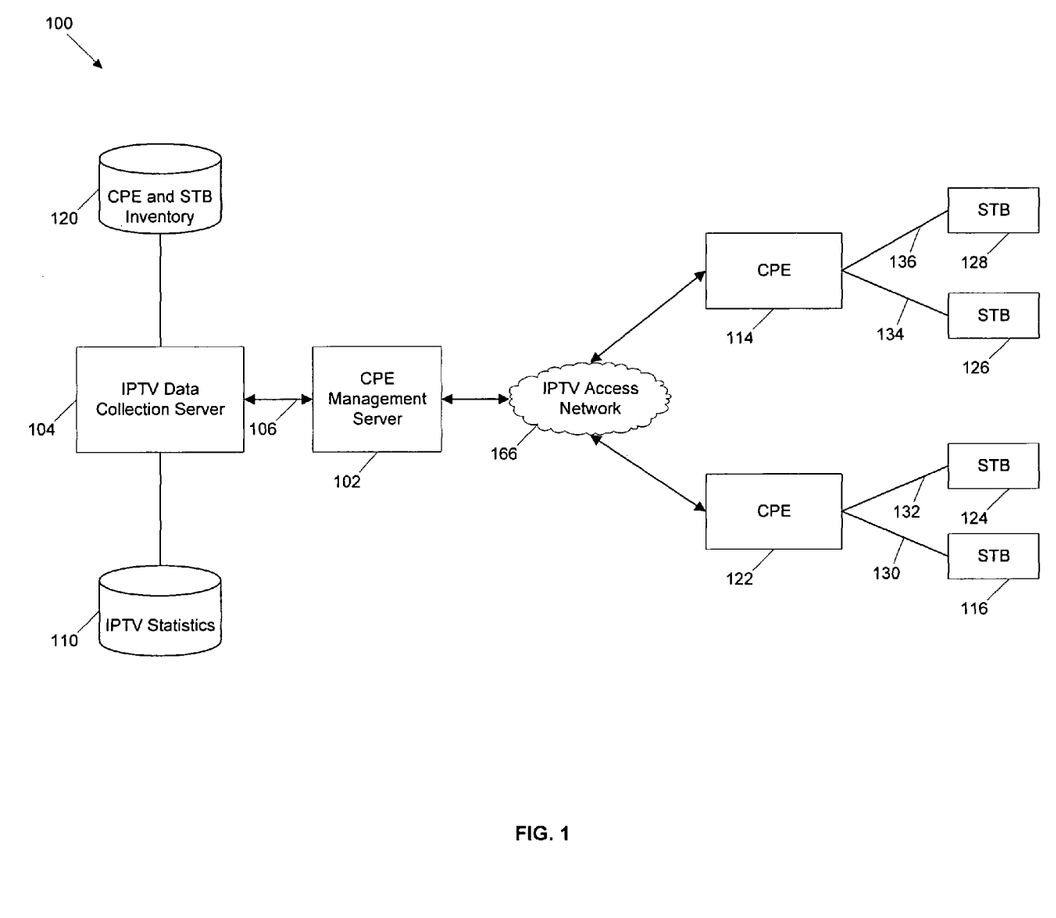
FIG. 1 is a block diagram of a particular embodiment of a system that may be used to provide performance data.

Referring to FIG. 1, a communication system 100 that may be used to provide performance data is disclosed. The system 100 includes infrastructure equipment such as an Internet Protocol Television (IPTV) data collection server 104, an IPTV statistics storage area 110, a customer premises equipment (CPE) and set-top box (STB) device inventory storage area 120, and a CPE management server 102. The CPE management server 102 is coupled to the IPTV data collection server 104 via a Web service interface 106.

The system 100 further includes customer premises equipment, such as representative CPE units 122 and 114, and end user interactive television devices, such as set-top box devices 116, 124, 126, and 128. The CPE units 122 and 114 may each include a router, a local area network device, a modem, such as a digital subscriber line (DSL) modem, a residential gateway, or any combination thereof. The CPE unit 122 is coupled to a plurality of set-top box devices, such as a first representative set-top box device 116 and a second representative set-top box device 124. The CPE unit 122 is coupled to the first representative set-top box device 116 via a first communication link 130 and the CPE unit 122 is coupled to the second representative set-top box device 124 via a second communication link 132. The CPE unit 114 is coupled to a plurality of set-top box devices, such as set-top box devices 126 and 128. The CPE unit 114 is coupled to the set-top box device 126 via a communication link 134 and the CPE unit 114 is coupled to the set-top box device 128 via a communication link 136. Various communication link technologies may be used to support communication of data, such as Internet Protocol Television (IPTV) data, via the communication links 130, 132, 134, and 136. Each of the CPE units 114 and 122 communicate with an IPTV access network 166, which in turn is coupled to the CPE management server 102 for the communication of data and performance measurement information. The CPE management server 102 may communicate with the CPE units 114, 122 according to a CPE wide area network (WAN) management protocol, such as Technical Report 69 (TR69).

In a particular embodiment, the IPTV data collection server 104 may send a request to the CPE management server 102 via the Web service interface 106 for performance data associated with a set-top box device, such as one or more of the set-top box devices 116, 124, 126, and 128. The request may be sent periodically, such as every 5 minutes, at a fixed time, such as at 2:00 A.M. each morning, in response to a particular event, such as a customer complaint regarding the performance of a particular set-top box device, or any combination thereof. Each of the set-top box devices 116, 124, 126, and 128, may include a software interface that is independent of operating software at the respective set-top box device. The software interface may include processor executable instructions to respond to a performance data request.

The CPE and STB inventory storage area 120 may store information related to each of the CPE units and set-top box devices of the system 100. In an illustrative embodiment, the CPE and STB information may indicate the set-top box devices that may be accessed via a particular CPE unit. For example, the CPE and STB information may indicate that the set-top box devices 116, 124 are accessible via the CPE unit 122. The CPE and STB information may also indicate how often performance data should be collected from each respective set-top box device.

The CPE management server 102 may verify that a request for performance data is associated with a validated CPE unit by use of CPE access certificates associated with the CPE units of the system 100. The CPE management server 102 may also translate a request for performance data received from the IPTV data collection server 104 to a CPE WAN management protocol before sending a performance data request to a particular CPE unit.

Figure 4:
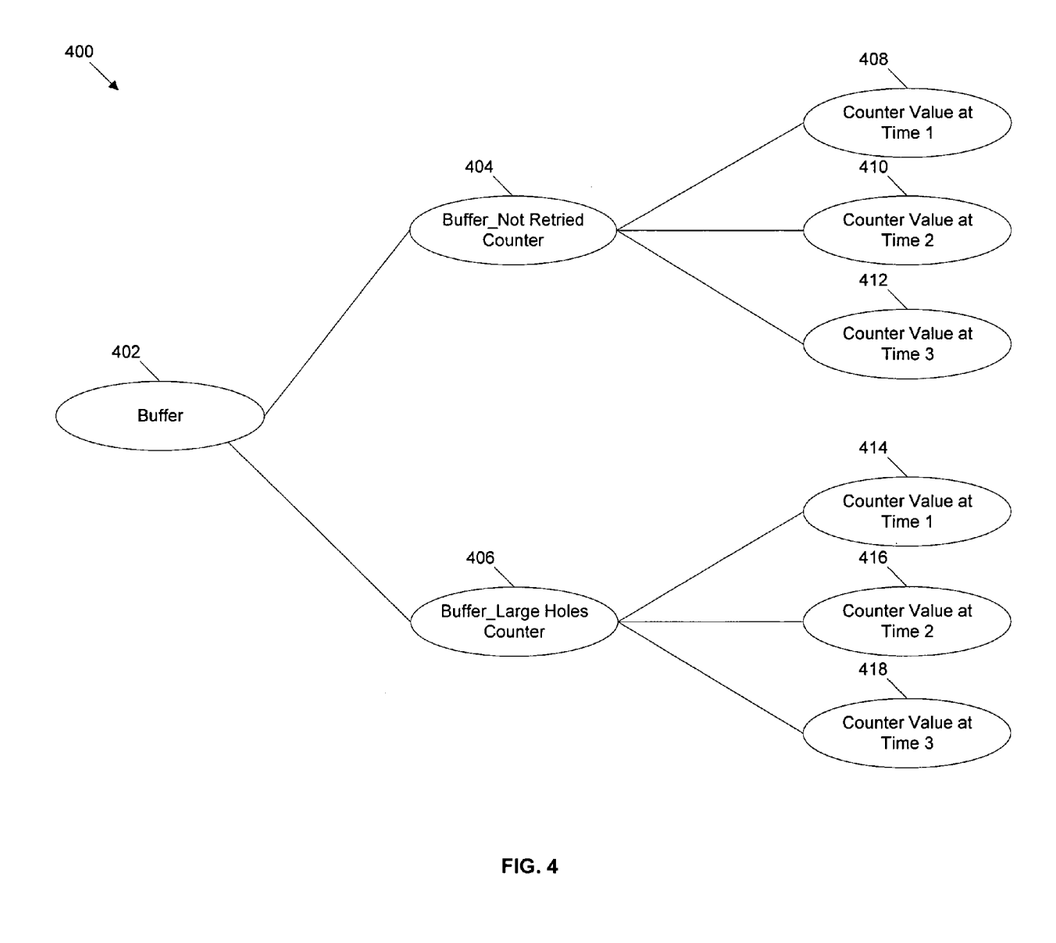
FIG. 4 is a diagram of a data structure that may be used to collect performance data.

In a particular embodiment, the set-top box device 116 may receive a performance data request from the CPE unit 122. The performance data request may identify at least one performance data measurement and the at least one performance data measurement may relate to one or more performance aspects of operations of the set-top box device 116. For example, the performance data measurement may indicate packet loss, which can affect the quality of video content provided to the set-top box device 116. After receiving the performance data request, the set-top box device 116 is operable to identify a first portion of a data structure that includes the particular performance data measurement. The data structure may also include a second portion that is designated for a second performance data measurement. The data structure may be stored within a data storage device either embedded within or coupled to the set-top box device 116. An example of a data structure related to storage and retrieval of performance data is illustrated in FIG. 4.

After the first portion of the data structure is identified, the set-top box device 116 is operable to retrieve the data associated with the requested performance data measurement from the data storage device based on the first portion of the data structure and the data associated with the requested performance data measurement is communicated to the CPE unit 122. Thereafter, the CPE unit 122 may be operable to communicate the collected performance measurement data to the CPE management server 102 via the IPTV access network 166. The CPE management server 102 may receive performance data measurements from a plurality of CPE units and forward the performance data measurements to the IPTV statistics storage area 110 via the Web service interface 106 and via the IPTV data collection server 104.

Figure 2:
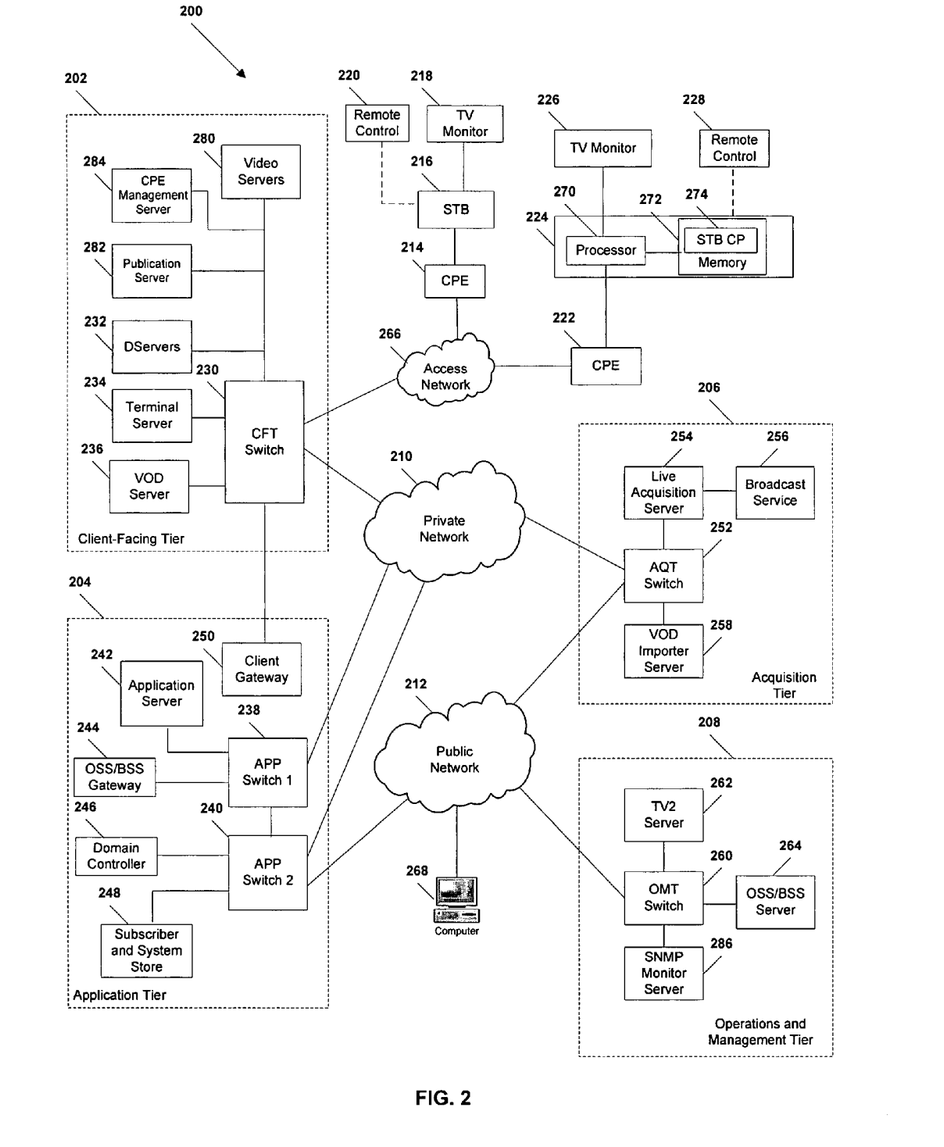
FIG. 2 is a block diagram of a second particular embodiment of a system that may be used to provide performance data.

Referring to FIG. 2, an illustrative embodiment of an Internet Protocol Television (IPTV) system that may be used to provide performance data is illustrated and is generally designated 200. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 222.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

The client-facing tier 202 can communicate with user equipment via an access network 266, such as an Internet Protocol Television (IPTV) access network. In an illustrative embodiment, customer premises equipment (CPE) 214, 222 can be coupled to a local switch, router, or other device of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premise, and the second representative set-top box device 224 and the second CPE 222 can be located at a second customer premise. In another particular embodiment, the first representative set-top box device 216 and the second representative set-top box device 224 can be located at a single customer premise, both coupled to one of the CPE 214, 222. The CPE 214, 222 can include routers, local area network devices, modems, such as digital subscriber line (DSL) modems, any other suitable devices for facilitating communication between a set-top box device and the access network 266, or any combination thereof. The client-facing tier 202 may include a CPE management server 284 that manages communications to and from the CPE 214 and the CPE 222.

In an exemplary embodiment, the client-facing tier 202 can be coupled to the CPE 214, 222 via fiber optic cables. In another exemplary embodiment, the CPE 214, 222 can include digital subscriber line (DSL) modems that are coupled to one or more network nodes via twisted pairs, and the client-facing tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control 220, and the second set-top box device 224 can communicate with a second remote control 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, the set-top box devices 216, 224 can each include a STB processor 270 and a STB memory device 272 that is accessible to the STB processor 270. In one embodiment, a computer program, such as the STB computer program 274, can be embedded within the STB memory device 272.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a point of connection to the IPTV system 200 via the client-facing tier 202. In a particular embodiment, the CFT switch 230 can be coupled to a video-on-demand (VOD) server 236 that stores or provides VOD content imported by the IPTV system 200. Further, the CFT switch 230 is coupled to one or more video servers 280 that receive video content and transmit the content to the set-top boxes 216, 224 via the access network 266.

In an illustrative embodiment, the client-facing tier 202 can communicate with a large number of set-top boxes, such as the representative set-top boxes 216, 224, over a wide geographic area, such as a metropolitan area, a viewing area, a statewide area, a regional area, a nationwide area or any other suitable geographic area, market area, or subscriber or customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming, display, messaging, processing of VOD material and other IPTV content, etc. In an illustrative embodiment, the application server 242 can provide location information to the set-top box devices 216, 224. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers 268 via the public network 212. For example, the domain controller 246 can provide remote Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224. In another illustrative embodiment, the subscriber and system store can store data associated with capabilities of set-top box devices associated with particular customers.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224 can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber and/or billing information, the client gateway 250 can allow the set-top box device 216 to access IPTV content and VOD content at the client-facing tier 202. If the client gateway 250 cannot verify subscriber information for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television content, movie content, advertisement content, other video content, or any combination thereof, from a broadcast service 256, such as a satellite acquisition system or satellite head-end office. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video or audio portions of the content can be streamed to the set-top box devices 216, 224.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230. Upon receiving such requests, the VOD server 236 can retrieve the requested VOD content and transmit the content to the set-top box devices 216,224 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 286 that monitors network devices within or coupled to the IPTV system 200. In a particular embodiment, the OMT switch 260 can communicate with the AQT switch 252 via the public network 212. The OSS/BSS server 264 may include a cluster of servers, such as one or more IPTV data collection servers that are operable to request and store operations systems data, such as network device performance data collected from the set-top box devices 216, 224.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 coupled to the public network 212.

Figure 3:
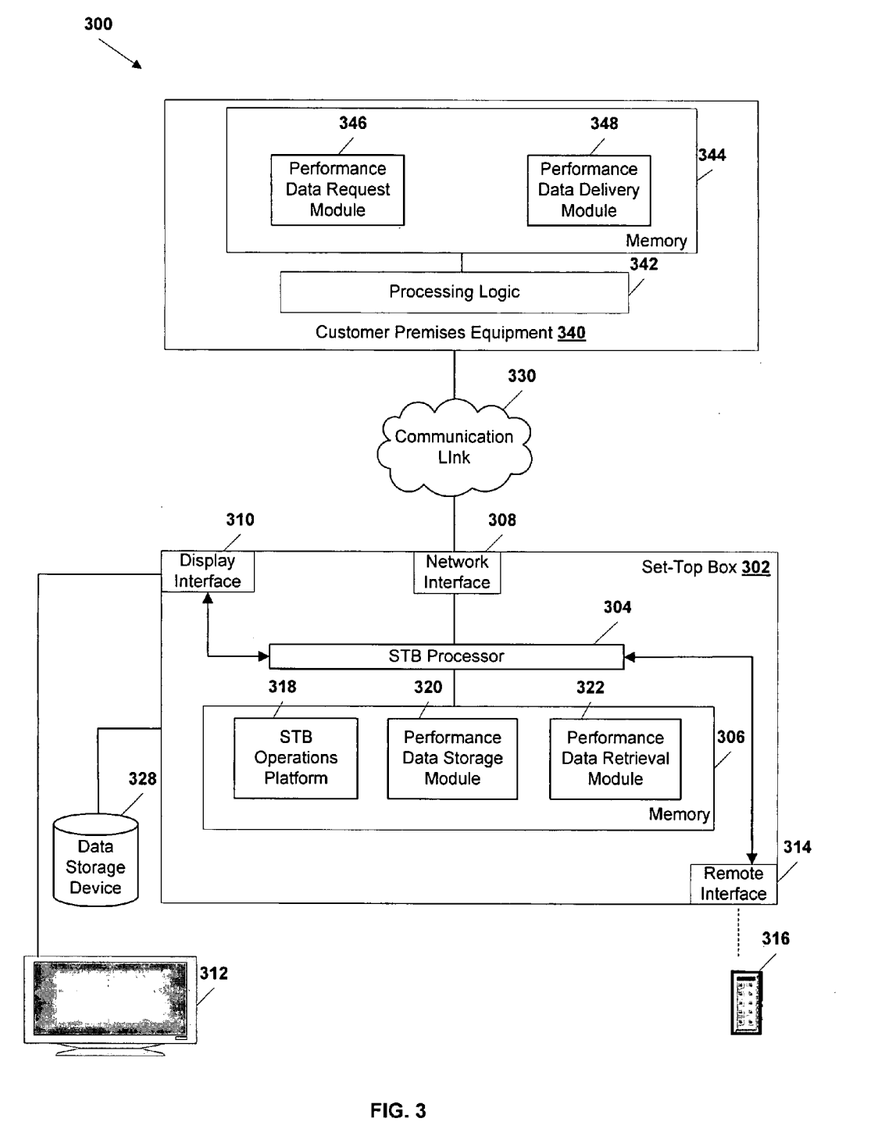
FIG. 3 is a block diagram of a third particular embodiment of a system that may be used to provide performance data.

Referring to FIG. 3, a particular embodiment of a system that may be used to provide performance data is illustrated and generally designated 300. The system 300 includes representative customer premises equipment (CPE) 340, a communication link and associated network 330, and a representative set-top box (STB) device 302. The set-top box device 302 is coupled to the CPE 340 via the communication link 330. The set-top box device 302 is also coupled to a display device 312 and is coupled via a memory interface (not shown) to a data storage device 328. In addition, the set-top box device 302 is coupled for communication via remote interface 314 to a remote control device 316.

The set-top box device 302 includes a network interface 308 for access to the communication link 330 and includes a display interface 310 for access to the display device 312. The network interface 308 and the display interface 310 are coupled to STB processor 304. The STB processor 304 is also coupled to the remote interface 314 and memory 306. The memory 306 includes a plurality of executable software modules including a STB operations platform 318, a performance data retrieval module 320, and a performance data storage module 322.

In a particular embodiment, the STB operations platform 318 may be a customized client software platform, such as the Microsoft® Internet Protocol Television (IPTV) client software, for customized execution via the STB processor 304 of IPTV functions related to the set-top box device 302. The IPTV functions of the set-top box device 302 may include receiving video content, providing received video content to a display device, recording video content, providing one or more graphical user interfaces related to the functions supported by the set-top box device 302, providing an electronic program guide (EPG), or any combination thereof.

In a particular embodiment, the performance data storage module 320 is executable by the STB processor 304 to collect and store performance data measurements in the data storage device 328. In an illustrative embodiment, the data storage module 320 may be executable by the STB processor 304 to determine a value associated with a particular performance data measurement, such as the number of packets lost in a certain period of time, and then store the measured data value at the data storage device 328. In an illustrative, non-limiting embodiment, the data storage module 320 may be executable by the STB processor 304 to periodically collect and store performance data measurements at the data storage device 328. Further, the data storage module 320 may be executable by the STB processor 304 to collect and store performance data measurements using a data structure. The data structure may be organized such that the performance data measurements are retrievable externally upon request.

In a particular embodiment, the performance data retrieval module 322 is executable by the STB processor 304 to receive a performance data request from the CPE 340. The performance data request may identify a performance data measurement, such as an IPTV statistical measurement. The performance data measurement may include data related to reliable user datagram protocol (RUDP) successful retransmissions, RUDP un-successful retransmissions, packet loss, buffer not retried counter, buffer large holes counter, packets in, number of holes during a time interval, average hole size during the time interval, largest hole size during the time interval, decoder buffer underflow events, decoder re-buffering events, number of I-frames lost, I-frame decoding errors, moving picture experts group (MPEG) stream discontinuity count, or any combination thereof. Additionally, the performance data measurement may relate to a measurable performance aspect associated with the operation of the set-top box device 302, such as the quality of video content received at the set-top box device 302.

The performance data retrieval module 322 may be executable by the STB processor 304 to identify a portion of a data structure that includes the requested performance data measurement. In an illustrative embodiment, the data structure is a tree data structure. The tree data structure may include one or more tree nodes that each include performance data measurements. Further, each node of the tree data structure may include one or more branches that include a subset of performance data measurements.

In a particular embodiment, the performance data retrieval module 322 is executable by the STB processor 304 to retrieve the requested performance data measurement from the data storage device 328 based on the data structure and to send data associated with the performance data measurement to the CPE 340. The performance data retrieval module 328 may also be executable by the STB processor 304 to send the data associated with the requested performance data measurement in response to the performance data request in real-time or near real-time. In an illustrative, non-limiting embodiment, the performance data retrieval module 322 is executable by the STB processor 304 to automatically send data associated with one or more performance data measurements to the CPE 340. For example, the performance data retrieval module 322 may be executable by the STB processor 304 to periodically send specified performance data measurements to the CPE 340. In another example, the performance data retrieval module 322 is executable by the STB processor 304 to send specified performance data measurements to the CPE 340 in response to determining that values associated with the specified performance data measurements are outside of a predetermined range.

In a particular embodiment, the performance data storage module 320 and the performance data retrieval module 322 are included in a software interface that operates independently of the STB operations platform 318. In an illustrative embodiment, the STB operations platform 318 includes first instructions that are executed according to a first format and the software interface includes second instructions that are executed according to a second format. For example, the first instructions may be formatted according to the Microsoft® TV IPTV Edition and the second instructions may be formatted according to a home phoneline networking alliance (HPNA) standard, such as HPNA version 3.1. In another example, the second instructions may be formatted according to a remote procedure call (RPC) protocol.

The CPE 340 includes processing logic 342 and memory 344. The memory 344 includes a performance data request module 346 and a performance data delivery module 348. In a particular embodiment, the performance data request module 346 is executable by the processing logic 342 to send a performance data request to the set-top box device 302. The performance data request may automatically be sent to the set-top box device 302 periodically or in response to receiving a request for performance data from a network device, such as an IPTV data collection server. In an illustrative embodiment, the performance data request may be structured in a format that is independent of a format of a set-top box device operations platform. For example, the performance data request may be formatted according to a format associated with a software interface of the set-top box device 302, such as a RPC protocol or a HPNA standard.

In a particular embodiment, the performance data delivery module 348 is executable by the processing logic 342 to forward requested performance data received from the set-top box device 302 to a particular IPTV network device. In an illustrative embodiment, the performance data delivery module 348 is executable by the processing logic 342 to forward the requested performance data to a predetermined IPTV network device, to the IPTV network device that requested the performance data measurements, or any combination thereof.

For ease of explanation, the various modules 318-322 and 346-348 have been described in terms of processor-executable instructions. However, those skilled in the art will appreciate that such modules can be implemented as hardware logic, processor-executable instructions, or any combination thereof.

Referring to FIG. 4 a data structure 400 that may be used to store and provide performance data is illustrated. The data structure 400 is a tree data structure that may be used by a set-top box device to retrieve performance data measurements of the set-top box device, to store performance data measurements of the set-top box device, or any combination thereof. The data structure 400 may represent a part of a larger tree data structure that includes multiple nodes.

The data structure 400 includes a node 402. The node 402 may relate to performance data associated with a buffer that is associated with a particular set-top box device. The node 402 includes two branches, branch 404 and branch 406. The branch 404 may relate to a buffer_not retried counter of the particular set-top box device and the branch 406 may relate to a buffer_large holes counter of the particular set-top box device. The branch 404 may include data elements 408-412. The data elements 408-412 may relate to specific instances of collected performance data that are associated with the buffer_not retried counter. For example, the data element 408 may relate to the buffer_not retried counter value at a first time, the data element 410 may relate to a buffer_not retried counter value at a second time, and the data element 412 may relate to a buffer_not retried counter value at a third time. The branch 406 may include data elements 414-418. The data elements 414-418 may relate to a counter value associated with a buffer_large holes counter taken at a particular time. For example, the data element 414 may relate to a buffer_large holes counter value at a first time, the data element 416 may relate a buffer_large holes counter value at a second time, and the data element 418 may relate to a buffer_large holes counter value at a third time.

In an illustrative embodiment, after receiving a performance data request at a set-top box device from a customer premises equipment unit, the set-top box device may be operable to identify a node of the data structure 400 that relates to performance data associated with the request. For example, a request for performance data measurements related to a set-top box device buffer may be executed via the node 402. The performance data request may also indicate the performance data measurements associated with the node 402 that are to be retrieved. For example, the performance data request may relate to the value of a buffer_not retried counter at a specified time, such as at time 2. Accordingly, the set-top box device is operable to traverse the data structure from the node 402 to the branch 404 and then to the data element 410 to retrieve the requested performance data. The performance data request may also specify that all of the data associated with a particular node, all of the data associated with a particular branch, or any combination thereof, is to be retrieved. To illustrate, the performance data request may relate to retrieving all of the data associated with the branch 404 (i.e. the data associated with the data elements 408-412). In addition, the performance data request may relate to retrieving all of the data associated with the node 402 (i.e. the data associated with the data elements 408-418). Further, the performance data request may relate to retrieving data associated with the node 402 and data associated with an additional node of a larger data structure that includes the data structure 400.

Figure 5:
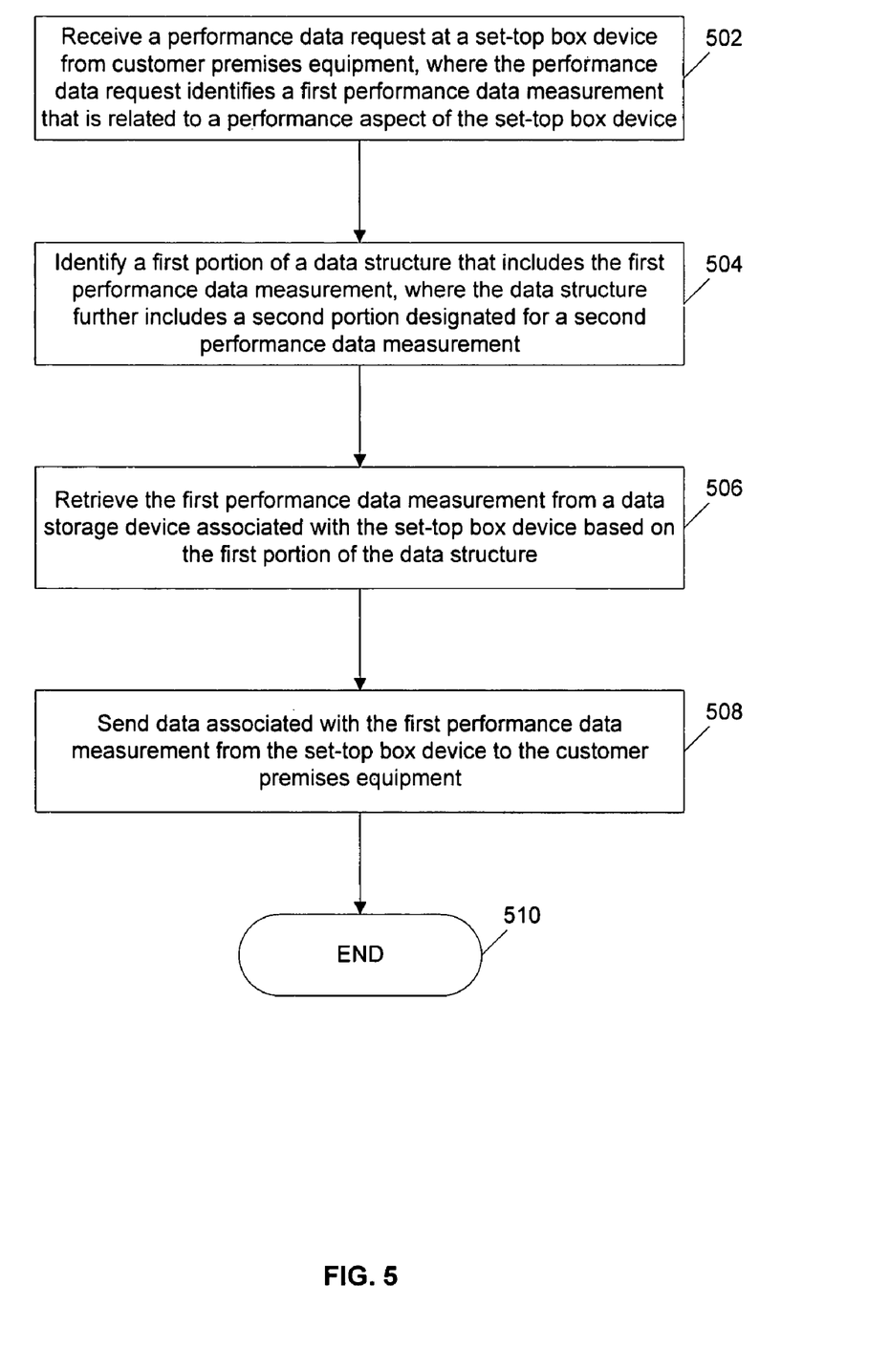
FIG. 5 is a flow diagram of a particular embodiment of a method of providing performance data.

Referring to FIG. 5 a method of providing performance data is illustrated. At block 502, a set-top box device receives a performance data request from customer premises equipment. The performance data request may identify a first performance data measurement that is related to a performance aspect of the set-top box device. The performance aspect of the set-top box device may relate to the quality of video content received at the set-top box device. In an illustrative, non-limiting embodiment, the performance data request may be formatted according to a remote procedure call (RPC) protocol. Moving to block 504, a first portion of a data structure may be identified that includes the first performance data measurement. The data structure may also include a second portion that is designated for a second performance data measurement or an alternative performance data measurement that may be available or accessible from the set-top box device. The data structure may be stored at a data storage device area of the set-top box device or at an external unit associated with the set-top box device. In an illustrative embodiment, the data structure may be a tree data structure, where the first portion of the data structure is associated with a first tree node and the second portion of the data structure is associated with a second tree node.

Proceeding to block 508, the first performance data measurement is retrieved from the data storage device associated with the set-top box device based on the first portion of the data structure. At block 508, data associated with the first performance data measurement is sent from the set-top box device to the requesting customer premises equipment. The method terminates at 510.

Figure 6:
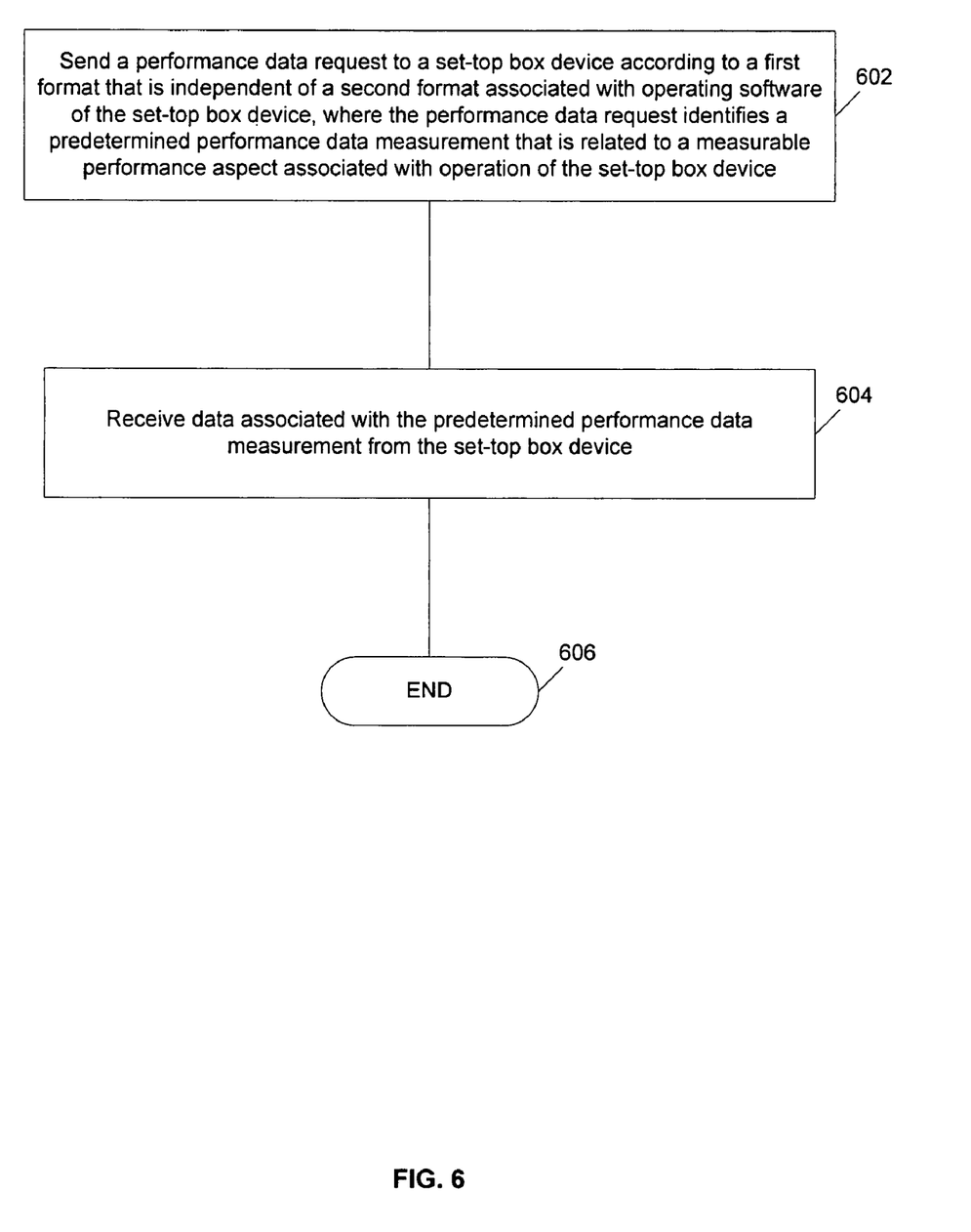
FIG. 6 is a flow diagram of a second particular embodiment of a method of providing performance data.

Referring to FIG. 6, a method of providing performance data is illustrated. At block 602, a performance data request is sent to a set-top box device from customer premises equipment according to a first format that is independent of a second format associated with operating software of the set-top box device. For example, the performance data request may be formatted according to a remote procedure call (RPC) protocol and the operating software may be formatted according to particular Internet Protocol Television (IPTV) software, such as Microsoft® TV IPTV Edition. In addition, the performance data request may identify a predetermined performance data measurement that may be related to a measurable performance aspect associated with operation of the set-top box device. Proceeding to block 604, the customer premises equipment receives data associated with the predetermined performance data measurement from the set-top box device. The data associated with the predetermined performance data measurement may be provided to the customer premises equipment from the set-top box device in real-time or near real-time with respect to sending the performance data request. The method terminates at 606.

Figure 7:
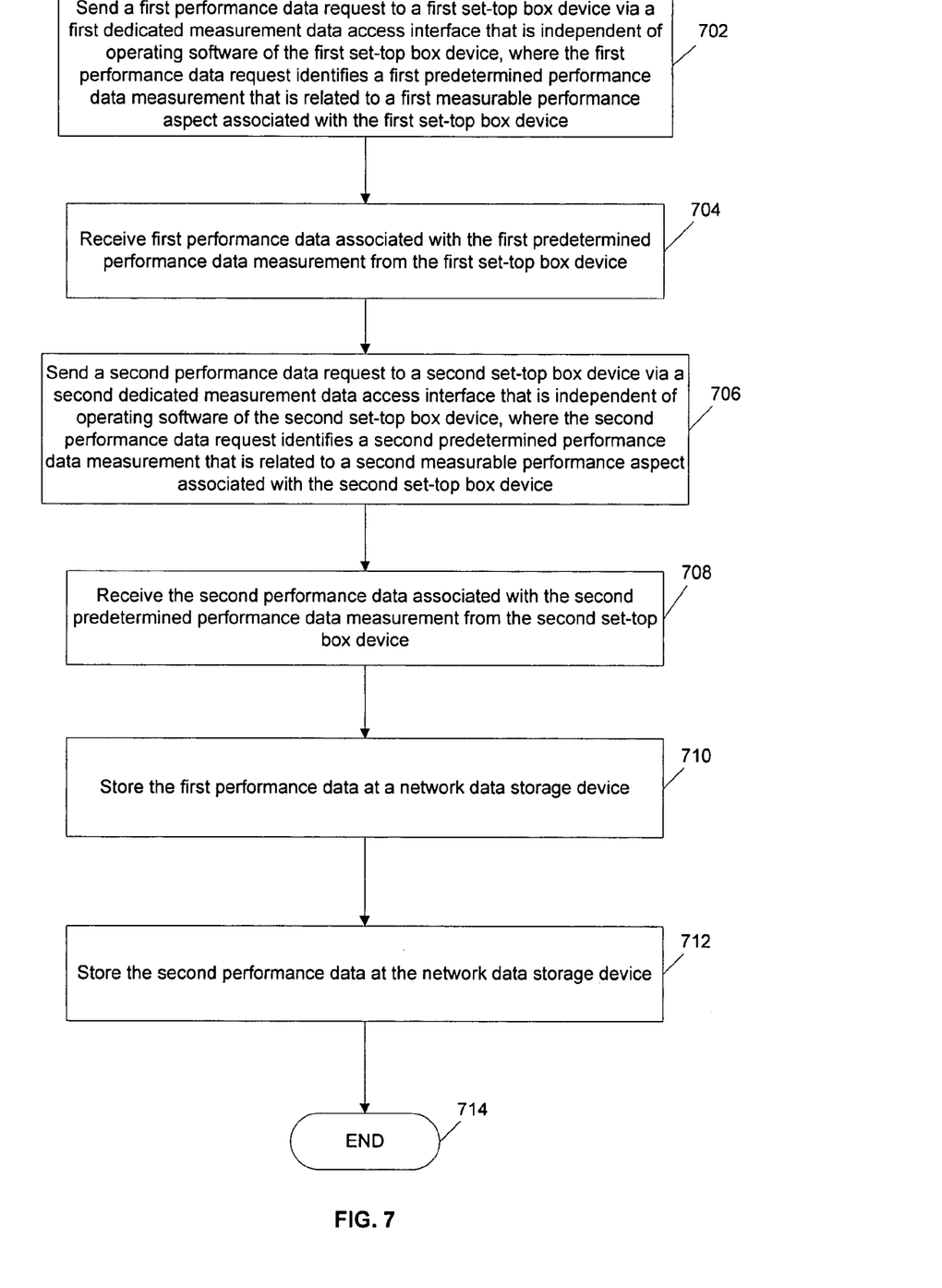
FIG. 7 is a flow diagram of a third particular embodiment of a method of providing performance data.

Referring to FIG. 7, a method of providing performance data from multiple set-top box devices is disclosed. At block 702, a first performance data request is sent to a first set-top box device from customer premises equipment via a first dedicated measurement data access interface. The first dedicated measurement data access interface is independent of the operating software of the set-top box device. In addition, the first performance data request identifies a first predetermined performance data measurement that relates to a first measurable performance aspect associated with operation of the first set-top box device. Moving to block 704, the customer premises equipment receives first performance data associated with the first predetermined performance data measurement from the first set-top box device.

Proceeding to block 706, the customer premises equipment sends a second performance data request to a second set-top box device via a second dedicated measurement data access interface. The second dedicated measurement data access interface is independent of the operating software of the second set-top box device. Additionally, the second performance data request may identify a second predetermined performance data measurement that relates to a second measurable performance aspect associated with operation of the second set-top box device. At block 708, the customer premises equipment receives second performance data associated with the second predetermined performance data measurement from the second set-top box device. In an illustrative embodiment, the first dedicated measurement data access interface, the second dedicated measurement data access interface, or any combination thereof, is operable according to a remote procedure call (RPC) protocol. In another illustrative embodiment, the first dedicated measurement data access interface, the second dedicated measurement data access interface, or any combination thereof, is operable according to a home phoneline networking alliance (HPNA) standard.

Moving to block 710, the customer premises equipment may be operable to store the first performance data at a network data storage device. Proceeding to block 712, the customer premises equipment may be operable to store the second performance data at the network data storage device. In an illustrative embodiment, the first performance data and the second performance data are stored at the network data storage device. For example, the first performance data, the second performance data, or any combination thereof, may include a group of data measurements, where the group of data measurements relates to a branch of a tree data structure. The method terminates at 714.

Figure 8:
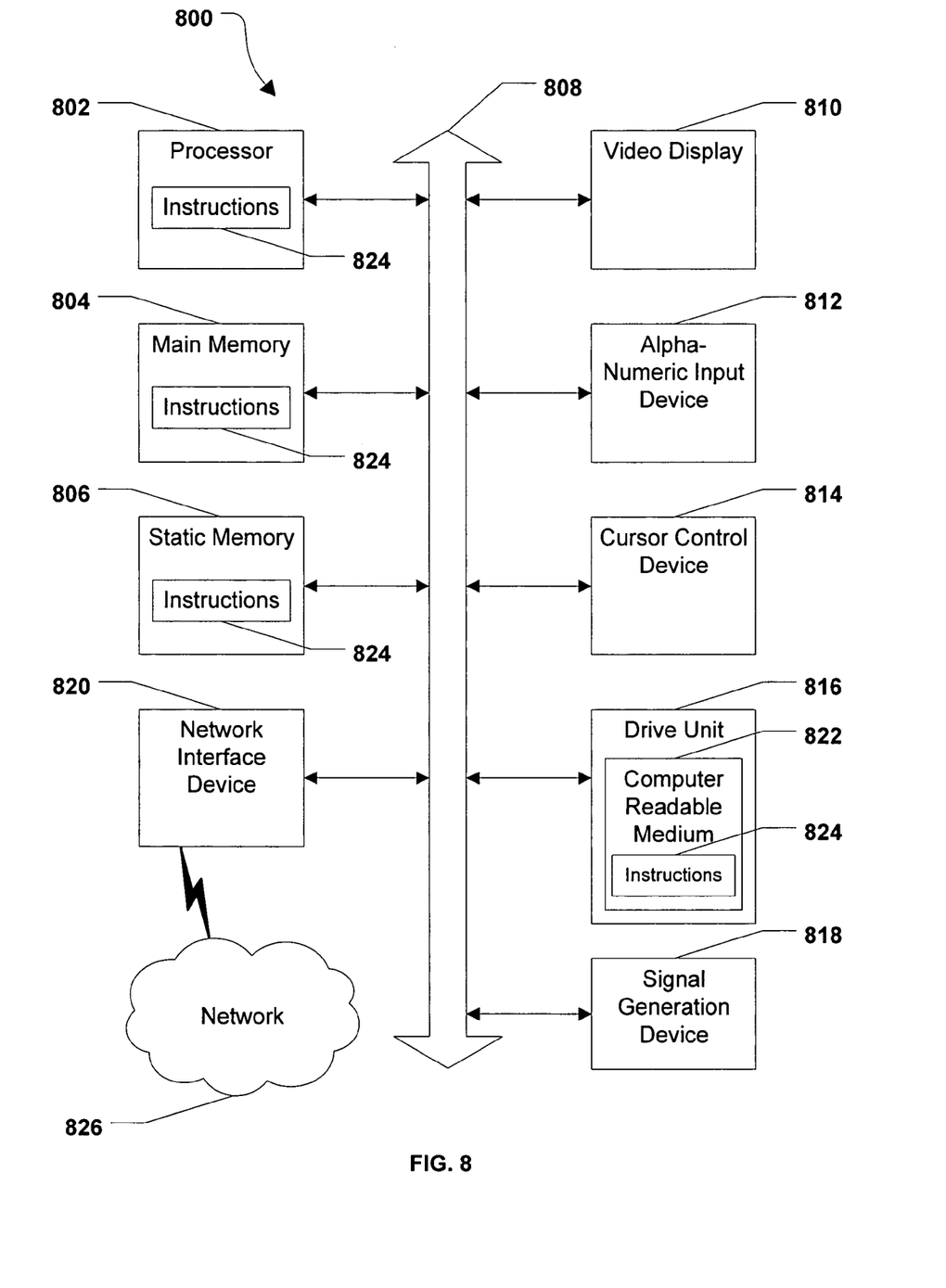
FIG. 8 is a block diagram of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800, or any portion thereof, may operate as a standalone device or may be connected, e.g., using a network, to other computer systems or peripheral devices, including an IPTV data collection server, a CPE management server, a CPE unit, or a set-top box device, as shown in FIGS. 1-3.

In a networked deployment, the computer system may operate in the capacity of an IPTV server, such as a video server or application server, or a set-top box device. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 864, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Further-more, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method of providing performance data, the method comprising:
    storing a first performance data measurement at a data storage device associated with a set-top box device;
    receiving a performance data request at the set-top box device from customer premises equipment, the performance data request identifying the first performance data measurement, the first performance data measurement related to a performance aspect of the set-top box device;
    identifying a first portion of a tree data structure that includes the first performance data measurement, wherein the tree data structure further includes a second portion designated for a second performance data measurement, wherein the tree data structure is stored at the data storage device associated with the set-top box device, wherein the first portion of the tree data structure corresponds to a first tree node, and wherein the second portion of the tree data structure corresponds to a second tree node;
    retrieving the first performance data measurement from the first tree node and from the data storage device based on the first portion of the tree data structure; and
    sending data associated with the first performance data measurement from the set-top box device to the customer premises equipment.

2. The method of claim 1, wherein the set-top box device collects the first performance data measurement and stores the first performance data measurement in a manner retrievable via the first portion of the tree data structure.

3. The method of claim 1, wherein the tree data structure is independent from a client device software platform associated with Internet Protocol Television (IPTV) operations of the set-top box device.

4. The method of claim 1, wherein the first performance measurement is an IPTV statistical measurement.

5. The method of claim 1, wherein the data is sent in response to the performance data request in real-time or near real-time.

6. The method of claim 1, wherein the request is formatted according to a remote procedure call (RPC) protocol.

7. The method of claim 1, wherein the first performance data measurement includes performance data related to reliable user datagram protocol (RUDP) successful retransmissions, RUDP un-successful retransmissions, packet loss, buffer not retried counter, buffer large holes counter, packets in, number of holes during a time interval, average hole size during the time interval, largest hole size during the time interval, decoder buffer underflow events, decoder re-buffering events, number of I-frames lost, I-frame decoding errors, moving picture experts group (MPEG) stream discontinuity count, or any combination thereof.

8. A computer-implemented method comprising:
sending a first performance data request to a first set-top box device via a first dedicated measurement data access interface that is independent of operating software of the first set-top box device, the first performance data request identifying a first predetermined performance data measurement, the first predetermined performance data measurement related to a first measurable performance aspect associated with operation of the first set-top box device;
receiving first performance data associated with the first predetermined performance data measurement from a first leaf of a tree data structure, wherein the first leaf is associated with the first set-top box device;
sending a second performance data request to a second set-top box device via a second dedicated measurement data access interface that is independent of operating software of the second set-top box device, the second performance data request identifying a second predetermined performance data measurement, the second predetermined performance data measurement related to a second measurable performance aspect associated with operation of the second set-top box device; and
receiving second performance data associated with the second predetermined performance data measurement from a second leaf of the tree data structure, wherein the second leaf is associated with the second set-top box device;
wherein the first performance data relates to the first leaf of the tree data structure, and wherein the second performance data relates to the second leaf of the tree data structure.

9. The method of claim 8, wherein the first dedicated measurement data access interface, the second dedicated measurement data access interface, or any combination thereof, is operable according to a remote procedure call (RPC) protocol.

10. The method of claim 8, wherein the first dedicated measurement data access interface, the second dedicated measurement data access interface, or any combination thereof, is operable according to a home phoneline networking alliance (HPNA) standard.

11. The method of claim 8, further comprising:
storing the first performance data at a network data storage device; and
storing the second performance data at the network data storage device.

12. The method of claim 11, wherein the first performance data and the second performance data are stored at the network data storage device.

13. The method of claim 12, wherein the first performance data, the second performance data, or any combination thereof, includes a group of data measurements.

14. The method of claim 13, wherein the group of data measurements relates to a branch of the tree data structure.

15. A computer-readable storage medium having instructions to cause a processor to execute a method comprising:
sending a first performance data request to a first set-top box device using a dedicated measurement data access interface that is independent of operating software of the first set-top box device, the first performance data request identifying a first predetermined performance data measurement, the first predetermined performance data measurement related to a first measurable performance aspect associated with operation of the first set-top box device;
receiving first performance data associated with the first predetermined performance data measurement from the first set-top box device;
sending a second performance data request to a second set-top box device using a dedicated measurement data access interface that is independent of operating software of the second set-top box device, the second performance data request identifying a second predetermined performance data measurement, the second predetermined performance data measurement related to a second measurable performance aspect associated with operation of the second set-top box device;
receiving second performance data associated with the second predetermined performance data measurement from the second set-top box device;
storing the first performance data at a first branch of a tree data structure of a network data storage device; and
storing the second performance data at a second branch of the tree data structure of the network data storage device;
wherein the first performance data corresponds to the first branch of the tree data structure, and wherein the second performance data corresponds to the second branch of the tree data structure.

16. The computer-readable medium of claim 15, wherein the first set-top box corresponds to a first node of the tree data structure, and wherein the second set-top box corresponds to a second node of the tree data structure.

* * * * *